(12) United States Patent
Giovanni

(10) Patent No.: US 7,102,984 B2
(45) Date of Patent: Sep. 5, 2006

(54) READING DATA IN PROBE-BASED STORAGE DEVICES

(75) Inventor: Cherubini Giovanni, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 585 days.

(21) Appl. No.: 10/657,545

(22) Filed: Sep. 8, 2003

(65) Prior Publication Data

US 2004/0105323 A1    Jun. 3, 2004

(30) Foreign Application Priority Data

Sep. 11, 2002   (EP)   ................... 02405787

(51) Int. Cl.
*G11B 9/00*    (2006.01)

(52) U.S. Cl. .................................. 369/126

(58) Field of Classification Search .............. None
See application file for complete search history.

(56) References Cited

U.S. PATENT DOCUMENTS

| | | | | |
|---|---|---|---|---|
| 5,537,372 A * | 7/1996 | Albrecht et al. | ............. | 369/43 |
| 5,808,977 A * | 9/1998 | Koyanagi et al. | ............. | 369/43 |
| 6,912,193 B1 * | 6/2005 | Cho et al. | ............. | 369/126 |

* cited by examiner

*Primary Examiner*—Paul W. Huber
(74) *Attorney, Agent, or Firm*—F. Chau & Associates LLC

(57) ABSTRACT

A probe-based storage device comprises a storage surface for storing data represented by deformations in the surface. A probe faces the surface and includes a resonant circuit having a reactance dependent on deflection of the probe relative to the surface. A scanner is provided for scanning the probe across the surface such that the probe follows said deformations. A detector reads data stored on the surface by detecting variation of the resonant frequency of said circuit.

10 Claims, 6 Drawing Sheets

READING DATA IN PROBE-BASED STORAGE DEVICES

BACKGROUND OF THE INVENTION

1. Technical Field

The present invention relates to a method and apparatus for reading data in probe-based data storage devices.

2. Discussion of Related Art

Techniques employing nanometer-sharp tips for imaging and investigating the structure of materials down to the atomic scale, such as the atomic force microscope (AFM) and the scanning tunneling microscope (STM), also find application in ultra high density storage devices. See, for example, U.S. Pat. No. 4,575,822 and P. Vettiger et al., "The Millipede—More than one thousand tips for future AFM data storage," IBM Journal of Research and Development, vol. 44 No. 3 May 2000, pp. 323–340. In the device described by Vettiger, information is stored as sequences of "pits" and "no pits" written on a polymer storage surface via an array of cantilevers each carrying a tip. The cantilevers, and the tips thereon, are selectively heated to write data onto the surface. The heating of each tip to a sufficient level produces a corresponding deformation of the surface adjacent the tip. The stored information is read back by treating each cantilever as a thermo-mechanical sensor in a circuit which is electrically equivalent, to a first degree of approximation, to a current source or a voltage source in cascade with a variable resistor. The sensor transforms the physical value carrying the read information into an electrical signal. The value of the variable resistor depends on the temperature at the tip of the cantilever. During the read process, the cantilever reaches different temperatures whether it moves over a "pit" (bit "1") or a "no pit" (bit "0"). A detection circuit senses a voltage which is dependent on the value of the cantilever resistance to make a decision on whether a "1" or a "0" is detected.

Conventionally, to read the recorded information, the cantilever employed for writing is provided with the additional function of a thermal read back sensor by exploiting its temperature dependent resistance. In general, the resistance increases non-linearly with heating power/temperature from room temperature to a peak value of 500–700 degrees C. The peak temperature is determined by doping concentration in the variable resistance of the cantilever, which ranges from $1\times10^{17}$ to $2\times10^{18}$ cm$^{-3}$. Above the peak temperature, the resistance drops as the number of intrinsic carriers increases through thermal excitation. For sensing, the resistor is operated at about 350° C. This temperature is not high enough to deform the surface as in the case of writing.

The principle of thermal sensing is based on the thermal conductance between the heater platform and the surface changing according to the distance between them. The medium between the heater platform and the surface, such as air, transports heat from the cantilever to the surface. When the distance between cantilever and surface is reduced as the tip moves into a pit, the heat transport through the air becomes more efficient. As a result, the evolution of the heater temperature in response to a pulse applied to the cantilever is different and, in particular, the maximum value achieved by the temperature is smaller than in the case in which no pit is present. As the value of the variable resistance depends on the temperature of the cantilever, the maximum value achieved by the resistance will be smaller as the cantilever moves over a pit. Therefore, during the read process, the cantilever resistance reaches different values whether it moves over a pit (bit "1") or no pit (bit "0").

The thermo-mechanical cantilever sensor, which transforms temperature into an electrical signal that carries information, is electrically equivalent, to a first degree of approximation, to a variable resistance. A detection circuit should therefore sense a voltage that depends on the value of the cantilever resistance to make a decision on whether a "1" or a "0" is written. The relative variation of thermal resistance is typically around $10^{-5}$/nm. Hence, a written bit "1" typically produces a relative change of the cantilever thermal resistance $\Delta R^{\ominus}/R^{\ominus}$ of about $10^{-4}$~$5\times10^{-4}$. The relative change of the cantilever electrical resistance is of the same order of magnitude. As a consequence, an important issue in detecting the presence or absence of a pit is a sufficiently high resolution to permit extraction of the signal that contains the information about the bit being "1" or "0". The signal carrying the information can be viewed as a small signal superimposed to a very large offset signal, which can be three to four orders of magnitude larger.

Parallel operation of large two-dimensional arrays can be achieved by a row/column time-multiplexed addressing scheme similar to that implemented in DRAMs. In the device described in [5], such a multiplexing scheme is employed to address the array column by column for parallel write/read operation within one column. In particular, read back signal samples are obtained by applying a read pulse to the cantilevers in a column of the array, low-pass filtering the cantilever response signals, and sampling the filter output signals. This process is repeated sequentially until all columns of the array are addressed, and then restarted from the first column. The time between two pulses corresponds to the time needed for a cantilever to move from one bit position to the next. Another problem encountered with time-multiplexed read operations based on thermo-mechanical sensing stems from an inherent limitation to achievable data rate which is determined by the cantilever thermal time constant. Specifically, a read pulse needs a duration at least equal to the time taken for the cantilever to achieve a temperature of about 350 degrees C., at which reading can take place.

SUMMARY OF INVENTION

In accordance with the present invention, there is now provided a probe storage device comprising: a storage surface for storing data represented by deformations in the surface; a probe facing the surface and including a resonant circuit having a reactance dependent on deflection of the probe relative to the surface; a scanner for scanning the probe across the surface such that the probe follows said deformations; and, a detector for reading data stored on the surface by detecting variation of the resonant frequency of said circuit. This advantageously permits detection of data from the storage surface without involving heating the probe. The device can thus operate with lower power dissipation. In addition, increased reading speeds can be achieved because consideration need not be given to the thermal time constant of the probe.

The reactance may comprise a variable inductance. Preferably, the variable inductance comprises a ferromagnetic element and a coil defining current path moveable relative to the ferromagnetic element in response to deflection of the probe. Alternatively, the reactance may comprise a variable capacitance.

In a preferred embodiment of the present invention to be described shortly, the detector comprises a first signal generator connected to the resonant circuit for generating a first signal in the resonant circuit and, a mixer for multiplying the output from the resonant circuit by a second signal synchronized to and phase shifted from the first signal and having a similar wave form to that of the first signal. The detector may comprise a second signal generator for generating the second signal, the first and second signal generators being synchronized by a synchronization signal. Alternatively, in the interests of simplicity, the detector may comprise a phase shifter having an input connected to the output of the first signal generator and an output connected to the mixer for generating the second signal by phase shifting the first signal. In a particularly preferred embodiment of the present invention, the detector comprises: a low pass filter for filtering the output of the mixer; and sample and hold circuit for sampling the output of the low pass filter; and a detection circuit for converting samples from the sample and hold circuit into binary values. The first and second signals preferably vary at substantially the resonant frequency of the resonant circuit when the probe is not deflected.

Viewing the present invention from another aspect, there is now provided a method for detecting data in a probe storage device, the method comprising: storing data as deformations in a storage surface; positioning a probe facing the surface and including a resonant circuit having a reactance dependent on deflection of the probe relative to the surface; scanning the probe across the surface such that the probe follows said deformations; and, reading data stored on the surface by detecting variation of the resonant frequency of said circuit.

In a preferred embodiment of the present invention, there is provided a method for reading back information written in a probe storage device based on an AFM cantilever array, in which each cantilever circuit is electrically equivalent to an RLC circuit comprising a resistance R, an inductance L, and a capacitance C. Rather than relying on variation of a cantilever resistance in dependence on temperature at the tip of a heated cantilever, sensing whether a "1" or a "0" is recorded is achieved by applying to the "cold" cantilever a sinusoidal wave form having a frequency equal to the resonant frequency of the RLC circuit, and observing the wave form at the output of the RLC circuit to detect a variation in the circuit transfer characteristics. For example, a variation of the phase characteristic can be obtained from variation of one or both reactance values of the RLC circuit (L and/or C). Such a variation is induced by movement of the probe over a "pit" or a "no pit". Many advantages over conventional thermo-mechanical reading techniques are achieved by this technique. As the read back process does not involve heating the cantilever to a relatively high temperature of about 350 degrees C., the rate at which reading can be performed is not limited by a thermal time constant. Thus, higher data rates can be achieved. Furthermore, a lower signal power is involved in detection because no signal energy is converted into thermal energy for heating the cantilever. Additionally, because the identity of a bit as a "1" or a "0" is encoded as a variation of phase and/or amplitude of a sinusoidal signal, detection of the useful signal does not take place in the presence of a large offset signal, as occurs in the case of thermo-mechanical reading.

BRIEF DESCRIPTION OF THE DRAWINGS

Preferred embodiments of the present invention will now be described, by way of example only, with reference to the accompanying drawings, in which.

DETAILED DESCRIPTION OF PREFERRED EMBODIMENTS

Figure 1:
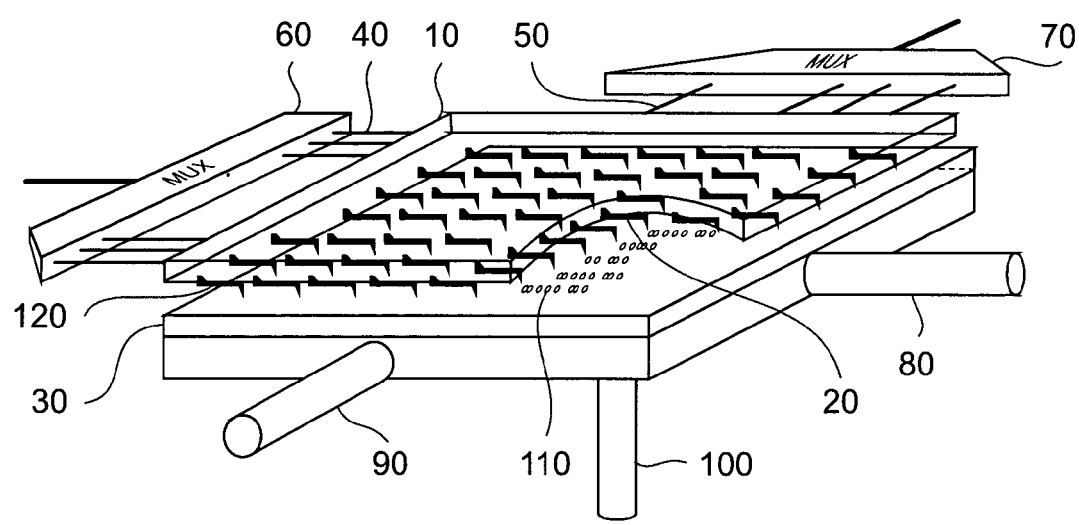
FIG. 1 is a block diagram of a probe storage device.

Referring first to FIG. 1 an example of a probe storage device embodying the present invention comprises a substrate 10 having a two dimensional array 120 of probe cantilever sensors 20 facing a storage surface 30. The cantilevers 20 are connected to row conductors 40 and column conductors 50. Each cantilever 20 is addressed by a different combination of a row conductor 40 and a column conductor 50. The row conductors 40 are selectively addressed via a row multiplexer 60. Similarly, the column conductors 50 are selectively addressed via a column multiplexer 70. The storage surface 30 is mounted on a scanner mechanism comprising an x position transducer 80, a y position transducer 90 and a z position transducer 100. In operation, the z transducer 100 moves the storage surface 30 towards or away from the array 120. The x transducer 80 and the y transducer 90 move the storage surface 30 in orthogonal directions relative to and within a plane parallel to the array 120. The transducers 80–100 may be piezoelectric, electromagnetic, or similar position control devices. The ranges of travel of the x transducer 80 and the y transducer 90 are such that, in use, each cantilever 20 is scanned across its own field of the storage surface 30 during both data reading operations and data writing operations. Such scanning may be performed in a raster like fashion. Each cantilever 20 carries at its distal end a tip or probe facing the storage surface and a resistive heater element adjacent the tip. During a write operation, each cantilever 20 from which data is to be written is engaged with the storage surface 30 via the z transducer 100 and connected to a write channel via the multiplexers 60 and 70. The write channel applies a write signal indicative of data to be stored to the cantilever 20. As herein before described, to write a binary "1", the write signal is of a magnitude sufficient to heat the tip via the heater element to a level sufficient to produce a local deformation or pit 110 in the storage surface 30 in the region of the tip. To write a binary "0", the write signal is maintained sufficiently low that no such local deformation of the storage surface 30 occurs. Multiple bits are thus written as the tips are scanned across the storage surface 30. Each cantilever 20 comprises an RLC circuit having a resistance R, a capacitance C, and a variable inductance L. During a read operation, each cantilever 20 from which data is to be read is engaged with the storage surface 30 via the z transducer 100 and connected to a read channel via the multiplexers 60 and 70. The tips are then scanned across the storage surface 30 and recorded data is read out via the read channel in a manner to be described shortly. The read channel described herein advantageously avoids the aforementioned problems associated with the prior art because it does not rely on a temperature dependent cantilever resistance to generate the read back signal.

Figure 2:
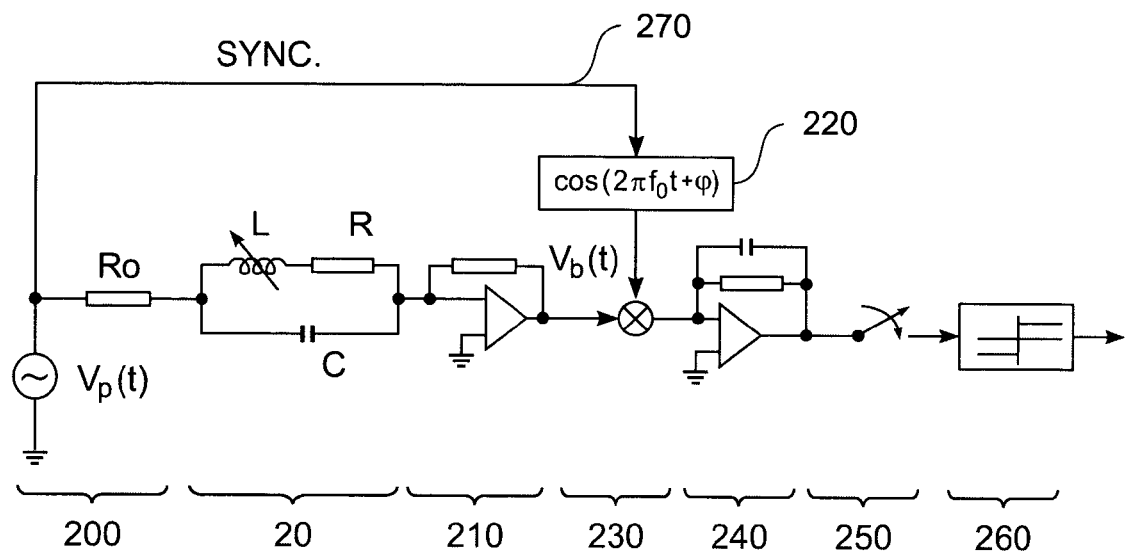
FIG. 2 is simplified circuit diagram of a read channel for the probe storage device.

Referring now to FIG. 2, in a preferred embodiment of the present invention, the read channel comprises: a first signal generator 200 having an internal resistance $R_O$; a buffer amplifier 210; a second signal generator 220; a mixer 230 having gain $K_m$, a low pass filter 240, a sample and hold circuit 250 and a threshold detector 260. The output of the second signal generator 220 is synchronized to the output of the first signal generator 210 via a synchronization signal 270. As shown in FIG. 2, in a preferred embodiment of the present invention, the synchronization signal 270 may be derived from the output of the first signal generator 210. However, in other embodiments of the present invention, both the first and second signal generators 210 and 220 may be synchronized by a common, independently generated synchronization signal. In operation, as will be described herein, the first and second signal generator 200 and 220 both generate sinusoidal signals. However, in other embodiments of the present invention, different wave forms may be employed. In operation, a pulse of AC signal or burst $V_p(t)$ generated by the signal generator 200 is applied to the cantilever RLC circuit. The expression of the applied burst is given by $$V_p(t) = A\, rect\left(\frac{t}{\tau}\right) \sin(2\pi f_0 t), \quad (1)$$

where $$rect\left(\frac{t}{\tau}\right) = \begin{cases} 1 & \text{if } 0 \le t \le \tau \\ 0 & \text{otherwise} \end{cases} \quad (2)$$

A denotes the burst amplitude, and $f_0$ is chosen approximately equal to the resonant frequency of the RLC circuit, i.e. $f_0 \approx 1/(2\pi\sqrt{LC})$ The value of the variable inductance L depends on the extent of deflection of the cantilever 20 as the tip moves over a pit 110. The relative variation of inductance is indicated by the parameter $\lambda_x = \Delta L_x/L$. The subscript x indicates the x-distance in the direction of scanning from the initial point. Therefore, the parameter $\lambda_x$ will take the largest absolute value when the tip of the cantilever 20 is located at the center of a pit 110. However, as the time taken for the cantilever 20 to move from the center of a pit 110 to the next is much larger than the duration of a read pulse, the current through the inductance does not vary significantly as a function of x during the period for which a read burst is applied. The signal $V_b(t,x)$ at the output of the buffer amplifier 210 is then given by $$V_b(t, x) = \frac{R_b}{R_0}\left(V_p(t) - L(1+\lambda_x)\frac{di_L}{dt} - Ri_L\right) \quad (3)$$

where $i_L$ denotes the current through the inductance, which obeys the differential equation $$L(1+\lambda_x)R_0C\frac{d^2 i_L}{dt^2} + (R_0 RC + L(1+\lambda_x))\frac{di_L}{dt} + (R_0 + R)i_L = V_p(t) \quad (4)$$

with initial conditions $$\left.\frac{d^2 i_L}{dt^2}\right|_{t=0} = \left.\frac{di_L}{dt}\right|_{t=0} = 0.$$

Assuming, for the purpose of explanation, that the time of application of a read burst corresponds either to the cantilever 20 being located at the center of a pit 110 for detecting a bit "1", or away from a pit 110 for detecting a bit "0". Two possible responses are obtained at the output of the buffer amplifier as solutions of (3–4), denoted by $V_b(t,x|a_x=1)$ and $V_b(t,x|a_x=0)$, respectively. Assuming, also for the purpose of explanation, that the duration of the transients is small compared to the duration of the burst $\tau$, in the time interval $[0,\tau]$ the two responses are approximately given by:

$$V_b(t,x|a_x=0) \approx |H(f_0)|A\, \sin(2\pi f_0 t + \phi),\ t \in [0, \tau] \quad (5)$$

and, $$V_b(t,x|a_x=1) \approx |H(f_0)|A\, \sin(2\pi f_0 t + \phi + \Delta\phi),\ t \in [0, \tau] \quad (6)$$

where $|H(f_0)|$ and $\phi$ denote the amplitude and phase of the frequency response of the internal resistance $R_0$ of the pulse generator 210 and the RLC circuit in series, respectively. The term $\Delta\phi$ stems from the variation in phase characteristic of the frequency response. In turn, this stems from the variation of the inductance as the tip moves over a pit 110.

Figure 3:
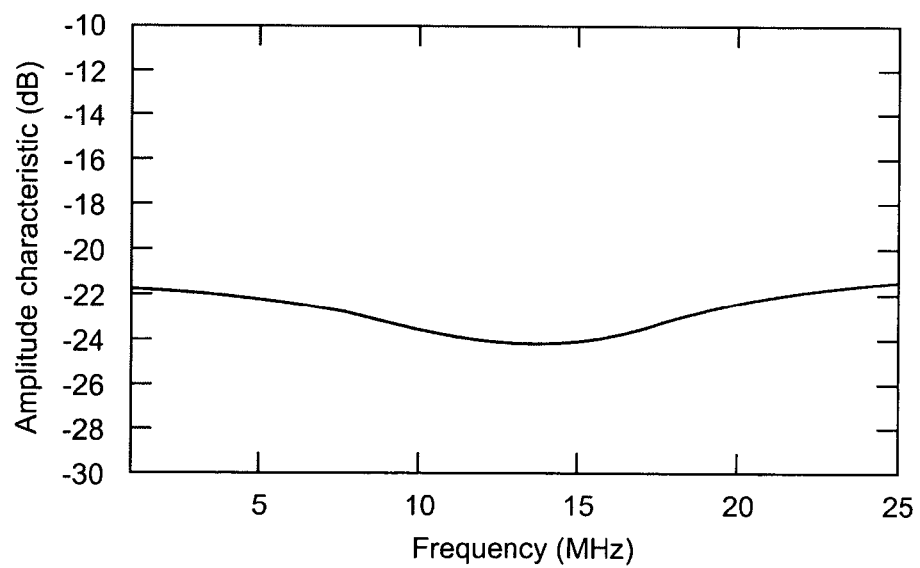
FIG. 3 is a frequency response in terms of amplitude characteristics corresponding to a cantilever in the probe storage device.
Figure 4:
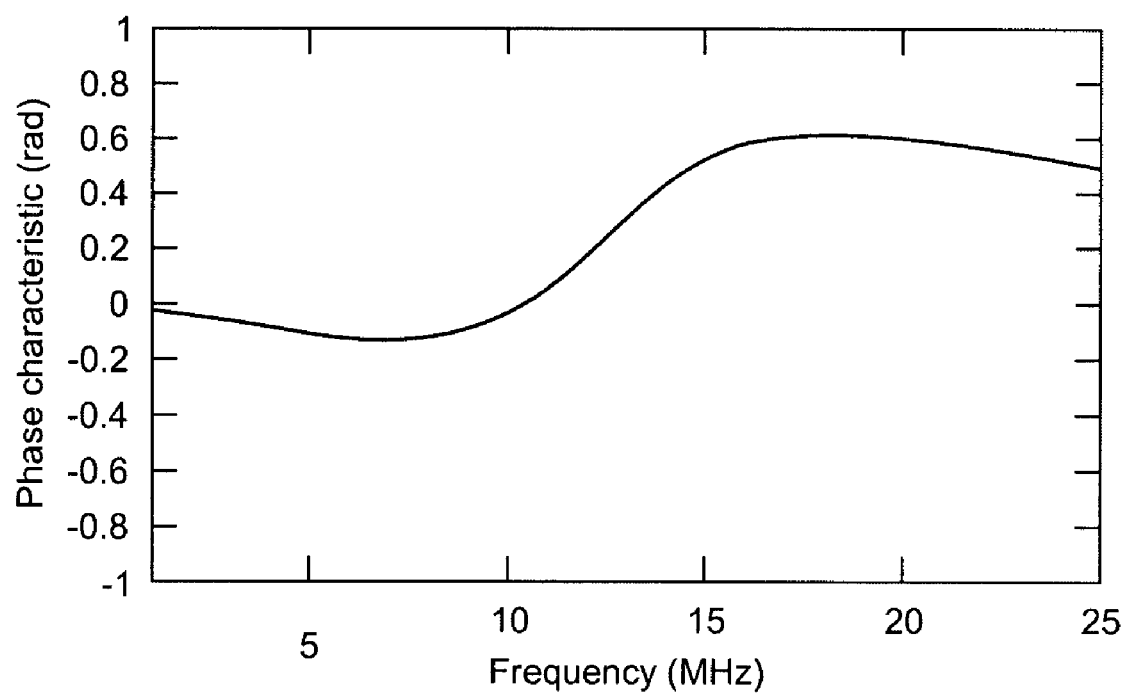
FIG. 4 is a frequency response in terms of phase characteristics corresponding to a cantilever in the probe storage device.

FIG. 3 illustrates the amplitude characteristics of the frequency response obtained for $R_0=100\Omega$, $R=50\Omega$, $L=1\ \mu H$, and $C=145$ pF. FIG. 4 illustrates the corresponding phase characteristics based on the same parameters.

The buffer output signal is multiplied by the mixer 230 with a sinusoidal wave form $\cos(2\pi f_0 t + \phi)$ from the second signal generator 220. For the two responses (5) and (6), the expressions of the resulting signals are given by:

$$V_b(t, x | a_x = 0) \cos(2\pi f_0 t + \varphi) \approx \frac{K_m |H(f_0)| A}{2} \sin(2(2\pi f_0 t + \varphi)), \quad (7)$$

$$t \in [0, \tau]$$

and, $$V_b(t, x | a_x = 1) \cos(2\pi f_0 t + \varphi) \approx \quad (8)$$

$$\frac{K_m |H(f_0)| A}{2}[\sin(2(2\pi f_0 t + \varphi)) + \sin(\Delta\varphi)],\ t \in [0, \tau],$$

respectively.

After multiplication by the sinusoidal wave form, the signal is filtered by the low pass filter 240 and sampled at the instant $t_s = \tau$ by the sample and hold circuit 250.

Assuming, for the purpose of explanation that the high-frequency signal components are completely suppressed by the low pass filter 240 with time constant $\tau_{lpf} = 1/(R_{lpf} C_{lpf})$, the values taken by the signal samples are $$V_{out}(a_x=0) \approx 0 \quad (9)$$

and $$V_{out}(a_x = 1) \approx \frac{K_m |H(f_0)| A}{2 C_{lpf}} (1 - e^{-\tau/\tau_{lpf}}) \sin(\Delta\varphi), \quad (10)$$

for the two cases of bit "0" and bit "1", respectively. The threshold detector 260 then detects a written bit, where the value of the threshold is given by $$V_{Th} = \frac{1}{2} V_{out}(a_x = 1) \quad (11)$$

Figure 5:
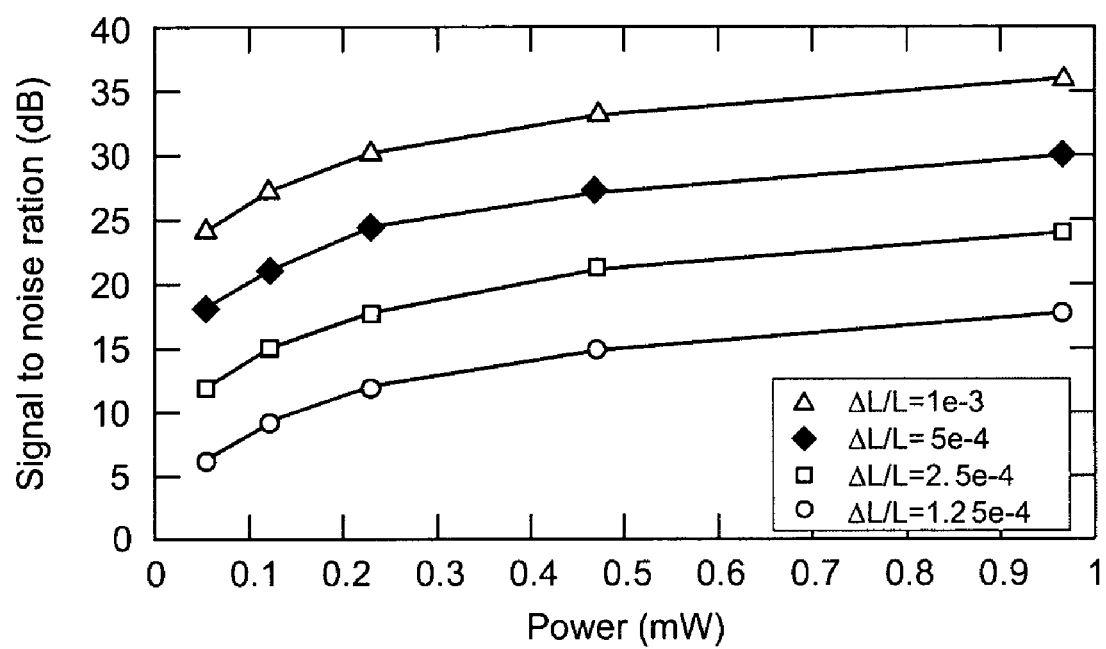
FIG. 5 is a graph showing Signal to Noise Ratios of the read channel as a function of the power of applied read pulse.

To determine performance of the channel, the signal-to-noise ratio (SNR) may evaluated at the detection point, according to $$SNR = 10 \log_{10}\left(\frac{V_{Th}^2}{\sigma_w^2}\right) \quad (12)$$

where the variance of the noise is dependent on the thermal noise introduced by the resistors and the equivalent input voltage noise power spectral density of the buffer amplifier. FIG. 5 shows the SNR as a function of the power of the applied pulse for various values of the parameter $\lambda_x$, assuming, for the purpose of explanation, a cantilever 20 having the characteristics illustrated in FIG. 3, a sinusoidal wave form frequency $f_0$=14 MHz, a low pass filter time constant $\tau_{lpf}$=12 µs, noise sources given by the resistors $R_0$ and R at room temperature, and a buffer amplifier 210 with one-sided noise power spectral density equal to $2 \times 10^{-17}$ V$^2$/Hz.

Figure 6:
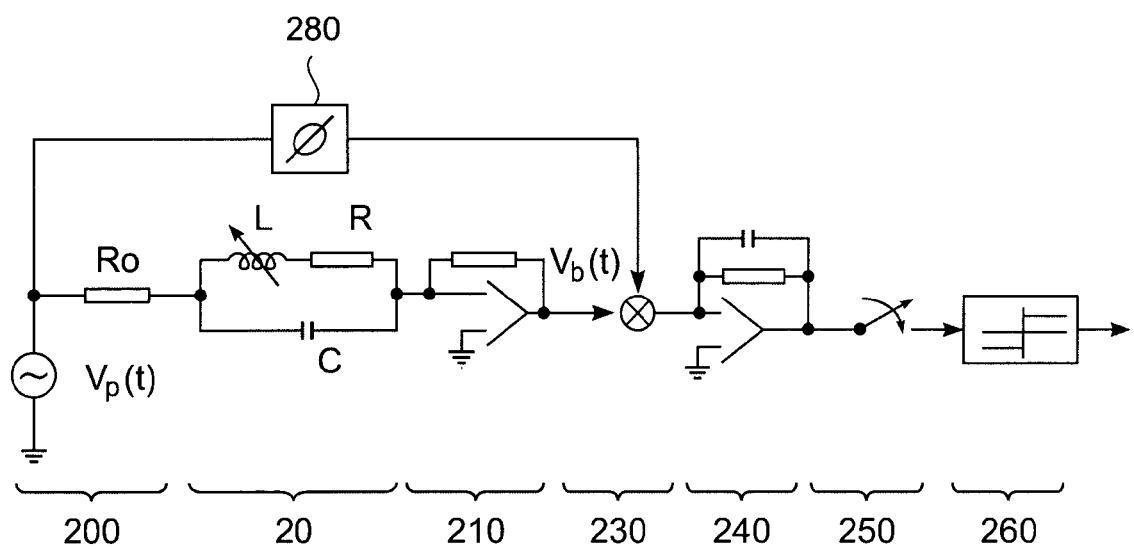
FIG. 6 is simplified circuit diagram of another read channel for the probe storage device.

Referring now to FIG. 6, in a modification of the read channel herein before described with reference to FIG. 2, the second signal generator 220 is replaced by a phase shifter 280 having an input connected to the output of the first signal generator 200 and an output connected to the mixer 230. In operation, the phase shifter produces the second signal $\cos(2\pi f_0 t + \phi)$ based on the output from the first signal generator 200. Thus phase shifter 280 thus insures that the second signal is synchronized to the first signal.

Figure 7:
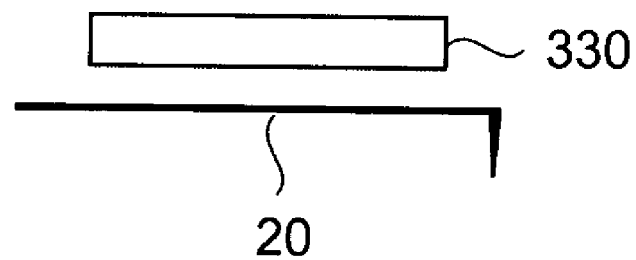
FIG. 7 is a side view of a cantilever of the array.
Figure 8:
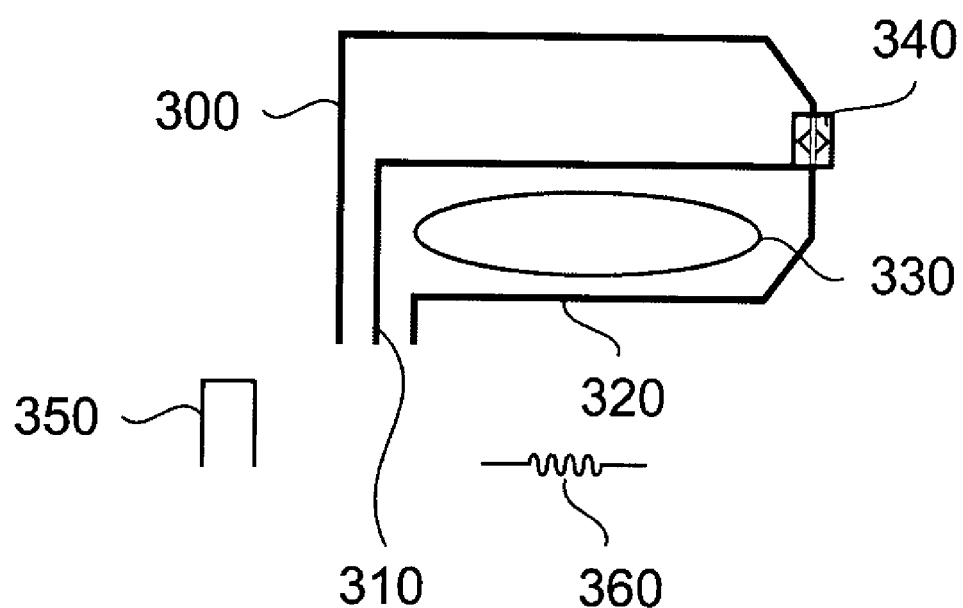
FIG. 8 is a plan view of a cantilever of the array.

Referring to FIGS. 7 and 8 in combination, in a particularly preferred embodiment of the present invention, each cantilever 20 comprises first, second, and third electrically conductive limbs 300, 310 and 320. The first limb 300 is connected to a temperature dependent resistor 340. The second, centrally disposed limb 310 provides a common return current path from the first limb 300 and the third limb 320. The third limb 320 acts as a coil. The reference numeral 320 will hereafter be interchangeably used in connection with both the third limb and the coil. A ferromagnetic element 330 is disposed in proximity to the third limb 320 such that the third limb 320 is deflected relative to the ferromagnetic element 330 as the cantilever 20 is deflected to provide the variable inductance L. The three-limb cantilever 20 can be used for the aforementioned thermo-mechanical writing method by applying a pulse 350 to the first limb 300, as well as for the disclosed reading method by applying a burst 360 from the signal generator 210 to the third limb 320.

The variable inductance is given by the ratio of the flux of the magnetic field through the plane defined by the coil 320 and the current through the coil 320, i.e. $L = \Phi_L / i_L$. The cantilever 20 is subject to a deflection as the tip moves over a pit 110. The flux of the magnetic field through the plane defined by the coil 320 thus varies as the tip moves over an pit 110. Thus, the value of the inductance of the cantilever 20 varies. Assuming, for the purpose of explanation, that the cantilever 20 acts as a coil 320 with a diameter of 50 µm, and the ferromagnetic element 330 is formed from a material having a relative permeability of 100000, values of inductance of the order of 1 µH can be obtained.

In alternate embodiments of the present invention, the aforementioned variation in phase characteristic of the cantilever 20 may be achieved by arranging for the capacitance of the cantilever 20 to be variable, with the inductance remaining fixed. Note however, that the values of capacitance obtained by considering, for example, a limb of the cantilever 20 and the substrate 10 as two plates of a capacitor with air as dielectric material are much smaller than 1 pF.

Although illustrative embodiments of the present invention have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

The invention claimed is:

1. Probe storage device comprising: a storage surface for storing data represented by deformations in the surface; a probe facing the surface and including a resonant circuit having a reactance dependent on deflection of the probe relative to the surface; a scanner for scanning the probe across the surface such that the probe follows said deformations; and, a detector for reading data stored on the surface by detecting variation of the resonant frequency of said circuit.

2. Device as claimed in claim 1, wherein the reactance comprises a variable inductance.

3. Device as claimed in claim 2, wherein the variable inductance comprises a ferromagnetic element and a coil defining current path moveable relative to the ferromagnetic element in response to deflection of the probe.

4. Device as claimed in claim 1, wherein the reactance comprises a variable capacitance.

5. Device as claimed in claim 1, wherein the detector comprises a first signal generator connected to the resonant circuit for generating a first signal in the resonant circuit and, a mixer for multiplying the output from the resonant circuit by a second signal synchronized to and phase shifted from the first signal and having a similar wave form to that of the first signal.

6. Device as claimed in claim 5, wherein the detector comprises a second signal generator for generating the second signal, the first and second signal generators being synchronized by a synchronization signal.

7. Device as claimed in claim 5, wherein the detector comprises a phase shifter having an input connected to the output of the first signal generator and an output connected to the mixer for generating the second signal by phase shifting the first signal.

8. Device as claimed in claim 5, wherein the detector comprises: a low pass filter for filtering the output of the mixer; and sample and hold circuit for sampling the output of the low pass filter; and a detection circuit for converting samples from the sample and hold circuit into binary values.

9. Device as claimed in claim 5, wherein the first and second signals vary at substantially the resonant frequency of the resonant circuit when the probe is not deflected.

10. Method for detecting data in a probe storage device, the method comprising: storing data as deformations in a storage surface; positioning a probe facing the surface and including a resonant circuit having a reactance dependent on deflection of the probe relative to the surface; scanning the probe across the surface such that the probe follows said deformations; and, reading data stored on the surface by detecting variation of the resonant frequency of said circuit.

* * * * *